United States Patent Office 3,575,816
Patented Apr. 20, 1971

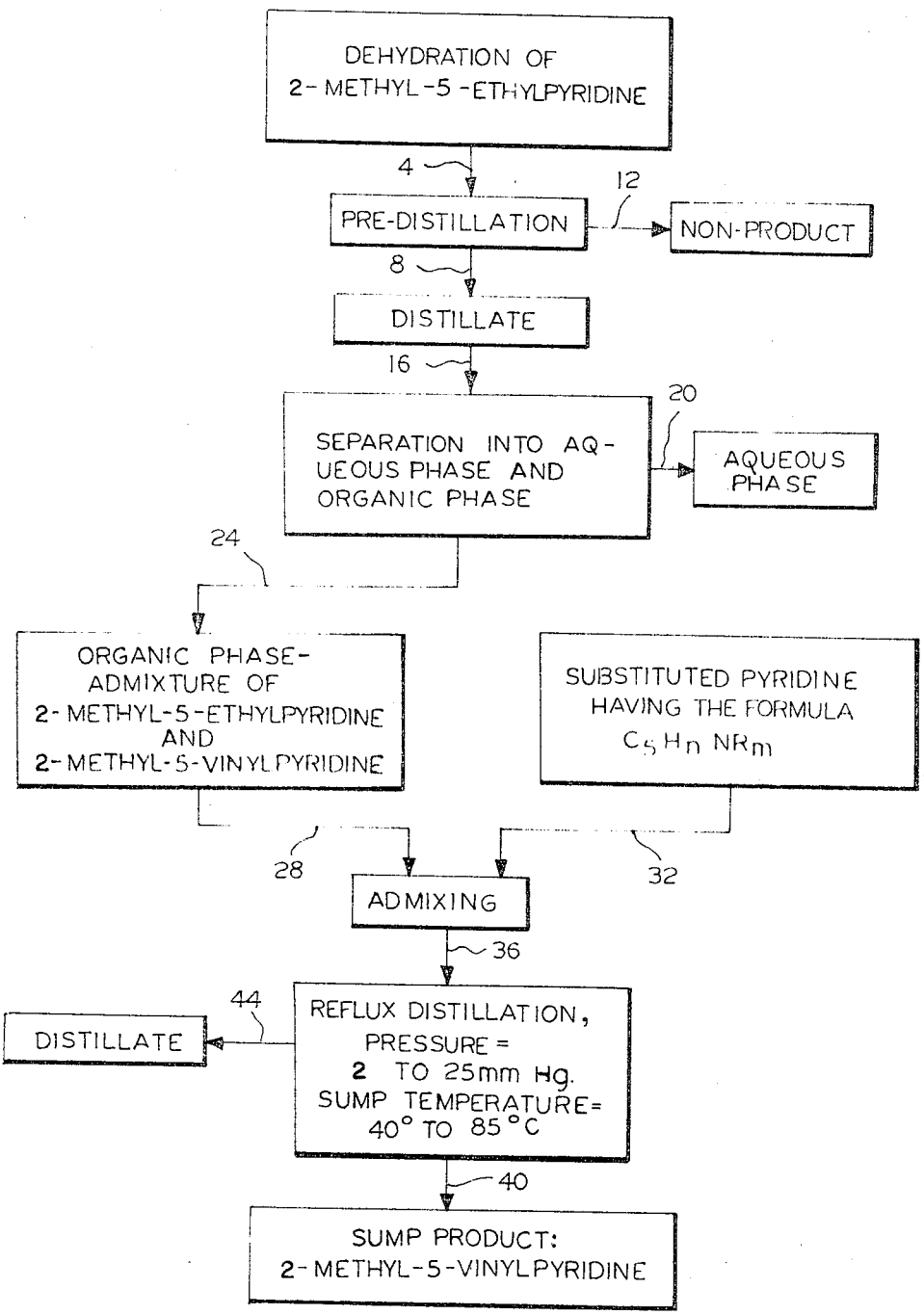

3,575,816
NOVEL PROCESS FOR RECOVERY OF 2-METHYL-5-VINYLPYRIDINE FROM MIXTURES WITH 2-METHYL-5-ETHYLPYRIDINE
Gerhart Schreiner, Visp, Valais, Switzerland, assignor to Lonza Ltd., Basel, Switzerland
Filed Nov. 14, 1968, Ser. No. 775,898
Claims priority, application Switzerland, Nov. 17, 1967, 16,162/67
Int. Cl. B01d 3/34; C07d 29/00
U.S. Cl. 203—8　　　　　　　　　　　　　　7 Claims

ABSTRACT OF THE DISCLOSURE

A process for recovering 2-methyl-5-vinylpyridine from mixtures containing 2-methyl-5-vinylpyridine and 2-methyl-5-ethylpyridine comprises vacuum distillation of mixtures containing the above compounds in the presence of a pyridine corresponding to the formula $C_5H_nNR_m$ wherein $n$ is 3 or 4, $m$ one or 2 and R is methyl or ethyl.

---

The present invention relates to a process for recovering 2-methyl-5-vinylpyridine from mixtures thereof and more particularly, from mixtures with 2-methyl-5-ethylpyridine by vacuum distillation in the presence of a pyridine corresponding to the formula $C_5H_nNR_m$.

Known methods of separating 2-methyl-5-vinylpyridine from 2-methyl-5-ethylpyridine have not been very successful. These compounds have boiling points at normal pressure which are so close, i.e., 179° C. and 178.3° C., that fractional distillation is extremely difficult. It has been suggested that the problem created by the very close boiling points could be overcome by steam distillation. Although these two compounds can be separated by steam distillation, this process has not gained acceptance because of the very high equipment cost and the large amounts of 2-methyl-5-vinylpyridine which can not be recovered from the mixture.

Attempts to separate the mixture in order to recover 2-methyl-5-vinylpyridine have been made under reduced pressures of 18–29 mm. Hg without favorable results. These vacuum distillation processes have not proved successful and, as with other known processes, result in very poor yields.

The present invention is directed to an improved process for separating 2-methyl-5-vinylpyridine from mixtures containing 2-methyl-5-vinylpyridine and 2-methyl-5-ethylpyridine which avoid the above disadvantages. I have discovered that mixtures of 2-methyl-5-vinylpyridine and 2-methyl-5-ethylpyridine can be efficiently separated by vacuum distillation in the presence of a substituted pyridine compound corresponding to the formula $C_5H_nNR_m$ wherein $n$ is 3 or 4, $m$ 1 or 2 and R is methyl or ethyl.

Distillation temperatures of 40° to 85° C. have been found satisfactory with pressures of 2–25 mm. Hg.

The still bottoms contain crude 2-methyl-5-vinylpyridine which can be purified by known processes, for example, distillation.

While substituted pyridines corresponding to the formula $C_5H_nNR_m$ are suitable for practicing the present invention, picolines such as alpha-picoline and lutidines such as 2,5-lutidine; 2,6-lutidines; as well as mixtures of these, are preferred. A substituted pyridine is added to the 2-methyl-5-vinylpyridine 2-methyl-5-ethylpyridine mixture in amounts of 2 to 30 weight percent and preferably 4 to 15 weight percent. The substituted pyridine can be added to the mixture in a conventional manner and is usually added at the bottom of the distillation column.

It is desirable to conduct the distillation in the presence of polymerization inhibitors such as sulfur, methylene blue, hydrosulfides and the like. To further minimize the degree of polymerization occurring during the distillation, it has been found desirable to maintain the still temperature no higher than 85° C. with temperatures of 55–75° C. and pressures of 4 to 15 mm. Hg being preferred.

The substituted pyridines added to the still are usually recovered from the distillate and may be returned to the still completely free of 2-methyl-5-ethylpyridine.

2methyl-5-vinylpyridine is frequently obtained by the conventional dehydration of 2-methyl-5-ethylpyridine. The dehydration product contains, in addition to 2-methyl-5-vinylpyridine, water, pyridine, picoline, lutidine and undehydrated 2-methyl-5-ethylpyridine. In practicing the present invention it is desirable to separate the water, pyridine, picoline and lutidine by a predistillation step to obtain a distillate which readily separates into an aqueous phase and an organic phase. The organic phase containing the substituted pyridines is separated and suitable for practicing the present invention.

The separation of 2-methyl-5-vinylpyridine by the process of the present invention may be conducted either batchwise or continuously. When conducting the process continuously, the 2-methyl-5-vinylpyridine, 2-methyl-5-ethyl-pyridine mixture is combined with the substituted pyridine and polymerization inhibitor and continuously introduced to the still. The 2-methyl-5-vinylpyridine containing still bottoms are continuously withdrawn from the sump as they are formed.

In practicing the present invention, it is desirable to have distillation columns with 14–18 theoretical trays.

The process of the present invention has the advantages that maximum separation is obtained in one run, with a small quantity of intermediate fractions containing a reduced amount of 2-methyl-5-vinylpyridine and more rapid distillations having a reduced reflux ratio.

The figure is a schematic of this invention.

In the figure 2-methyl-5-ethylpyridine is dehydrated and the dehydration mixture is conveyed (by means of line 4) to a pre-distillation step. The distillate is removed from the pre-distillation step (by means of line 8) and water, pyridine, picoline and lutidine is removed (by means of line 12). The distillate is moved to a separator (by means of line 16) where it separates into an aqueous phase and an organic phase. The aqueous phase is removed using line 20 and the organic phase is removed using line 24. The organic phase (using line 28) is admixed with a substituted pyridine (using line 32). The admixture is placed (line 36) in a reflux distillation column, the sump product, 2-methyl-5-vinylpyridine, is removed using line 40 and the distillate is removed using line 44.

EXAMPLES

Seven mixtures of 2-methyl-5-ethylpyridine and 2-methyl-5-vinylpyridine were subjected to reflux distillation using a distillation column having two silver-coated, vacuum-jacketed columns with an inside diameter of 30 mm., a total length of 1.6 m. having a V4A wind net spiral (3 x 3 mm.) and 16 theoretical trays therein. A flask heater having regulatory means was used to maintain still temperatures between 65° and 75° C. and a vacuum pump was used to maintain the pressure at 8 to 15 mm. Hg. The reflux ratios were adjusted by means of a magnetic column head and a so-called timer. The substituted pyridine was continuously introduced at the lower end of the distillation column with 10 to 500 mg. of methylene blue per 100 g. of the 2-methyl-5-vinylpyridine mixture to be separated.

The following table contains the results of the seven distillations with the values reported in Experiments 1 to 3 being for comparative purposes and demonstrates the large quantities of 2-methyl-5-vinylpyridine contained in the intermediate fractions with yields of crude pyridine being in the order of 80 percent.

Experiments 4 through 7 are conducted according to the present invention and demonstrate that the intermediate fractions contain very small quantities of 2-methyl-5-vinylpyridine and rough yields exceeding 90 percent may be obtained.

includes a polymerization inhibitor selected from the group consisting of sulfur, methylene blue and hydrosulfides.

5. The process of claim 4 wherein said distillation is conducted at a temperature between about 55° and 75° C. and a pressure between about 4 and 15 mm. Hg.

TABLE

| | Weight of mixture and components in grams | | | Base | | First runnings (to about 45° C.), g. | | Intermediate fraction (45–50° C.), g. | | | Crude MVP in the still sump | | Distillation rate, g./h. | Reflux ratio |
|---|---|---|---|---|---|---|---|---|---|---|---|---|---|---|
| | Total | MAP | MVP | Type | Amount | MAP | Base | Base | MAP | MVP | G. | Percent | | |
| Example No.: | | | | | | | | | | | | | | |
| 1 | 300 | 150 | 150 | | | 117.2 | | | 24.84 | 8.96 | 122.2 | 81.4 | 7–8 | 8:1 |
| 2 | 250 | 133 | 111 | | | 37.8 | | | 96.04 | 13.96 | 89.8 | 81.0 | 13–14 | 5:0.6 |
| 3 | 250 | 132 | 118 | | | 41.9 | | | 88.12 | 18.18 | 93.7 | 79.5 | 14–15 | 5:1 |
| 4 | 278.5 | 150.1 | 101 | 2,5-lutidine | 28.5 | 134.5 | 24.0 | 4.5 | 12.05 | 1.15 | 94.1 | 93.0 | 7–8 | 5:1 |
| 5 | 272.9 | 132 | 118 | 2,6-lutidine | 22.9 | 83.6 | 13.6 | 9.3 | 48.00 | 1.55 | 110.1 | 93.2 | 15–17 | 5:1 |
| 6 | 267.1 | 141.0 | 109 | α-Picoline | 17.1 | 98.7 | 15.5 | 1.8 | 21.88 | 3.22 | 99.5 | 91.4 | 13–15 | 5:1 |
| 7 | 261.1 | 128.5 | 121.5 | ....do.... | 11.1 | 87.1 | 7.5 | 3.6 | 35.20 | 4.20 | 107.6 | 88.5 | 12–13 | 5:1 |

MAP = 2-methyl-5-ethylpyridine. MVP = 2-methyl-5-vinylpyridine.

What I claim is:

1. A process which comprises (a) admixing a substituted pyridine of the general formula $C_5H_nNR_m$ in which $n$ signifies 4 or 3, $m$ is 1 or 2 and R is $CH_3$ or $C_2H_5$, with a premixture containing 2-methyl-5-ethylpyridine and 2-methyl-5-vinylpyridine, said substituted pyridine being present in an amount between 2 and 30 weight percent of said premixture and (b) distilling the resultant mixture at a pressure between 2 and 25 mm. Hg. and at a sump temperature between 40° and 85° C., whereby said 2-methyl-5-vinylpyridine is removed from the sump of the distillation column and said substituted pyridine, and said 2-methyl-5-ethylpyridine are distilled off.

2. A process according to claim 1 wherein said substituted pyridine is selected from the group consisting of alpha-picoline, 2,5-lutidine and 2,6-lutidine.

3. The process of claim 2 wherein the amount of said substituted pyridine is between 4 and 15 weight percent of said premixture.

4. The process of claim 3 wherein said resultant mixture

6. The process of claim 5 wherein said distillation is conducted in a continuous manner.

7. The process of claim 1 wherein said premixture is obtained by predistilling the reaction mixture obtained from the dehydration of 2-methyl-5-ethylpyridine during the production of 2-methyl-5-vinylpyridine, then water, pyridine, picoline and lutidine are distilled off from said reaction mixture.

References Cited
UNITED STATES PATENTS

| | | | |
|---|---|---|---|
| 2,445,944 | 7/1948 | Engel | 203—58 |
| 2,996,509 | 8/1961 | Turk et al. | 260—290 |
| 3,010,964 | 11/1961 | Nenz et al. | 260—290 |

WILBUR L. BASCOMB, Jr., Primary Examiner

U.S. Cl. X.R.

203—58, 73, 91; 260—290